(12) United States Patent
Liberty et al.

(10) Patent No.: US 10,120,463 B2
(45) Date of Patent: *Nov. 6, 2018

(54) DETERMINING FORWARD POINTING DIRECTION OF A HANDHELD DEVICE

(71) Applicant: IDHL Holdings, Inc., Wilmington, DE (US)

(72) Inventors: Matthew G. Liberty, Olney, MD (US); Bryan A. Cook, Silver Spring, MD (US)

(73) Assignee: IDHL Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/796,058

(22) Filed: Oct. 27, 2017

(65) Prior Publication Data

US 2018/0046266 A1 Feb. 15, 2018

Related U.S. Application Data

(63) Continuation of application No. 14/951,858, filed on Nov. 25, 2015, now Pat. No. 9,811,175, which is a (Continued)

(51) Int. Cl.
*G06F 17/16* (2006.01)
*G06F 3/01* (2006.01)
(Continued)

(52) U.S. Cl.
CPC ............ *G06F 3/0346* (2013.01); *G06F 3/017* (2013.01); *G06F 3/0383* (2013.01); *G06F 17/16* (2013.01); *G08C 17/02* (2013.01); *G08C 23/04* (2013.01); *H04N 5/4403* (2013.01); *G06F 2203/0384* (2013.01); *G08C 2201/32* (2013.01); *H04N 2005/4428* (2013.01)

(58) Field of Classification Search
None
See application file for complete search history.

(56) References Cited

U.S. PATENT DOCUMENTS 7,158,118 B2 1/2007 Liberty
2004/0268393 A1 12/2004 Hunleth et al.
(Continued)

FOREIGN PATENT DOCUMENTS

EP 2181740 5/2010
KR 102007001740 2/2007
(Continued)

OTHER PUBLICATIONS

"Chinese Office Action", Chinese Application No. 201180035248.6, dated Dec. 2, 2015.
(Continued)

*Primary Examiner* — Kent Chang
*Assistant Examiner* — Benjamin Morales Fernande
(74) *Attorney, Agent, or Firm* — Theodore Naccarella (57) ABSTRACT

A forward pointing direction associated with a handheld device is estimated or determined by, for example, calculating a center of rotation of the device. A resultant combined or selected bias estimate may then be used to compensate the biased output of the sensor in, e.g., a 3D pointing device.

20 Claims, 8 Drawing Sheets

Related U.S. Application Data continuation of application No. 13/701,156, filed as application No. PCT/US2011/039047 on Jun. 3, 2011, now Pat. No. 9,201,516.

(60) Provisional application No. 61/351,108, filed on Jun. 3, 2010.

(51) Int. Cl.
*G06F 3/038* (2013.01)
*G06F 3/0346* (2013.01)
*G08C 17/02* (2006.01)
*G08C 23/04* (2006.01)
*H04N 5/44* (2011.01)

(56) References Cited

U.S. PATENT DOCUMENTS

| | | | |
|---|---|---|---|
| 2005/0110773 A1 | 5/2005 | Chapman et al. | |
| 2005/0125826 A1 | 6/2005 | Hunleth et al. | |
| 2005/0174324 A1 | 8/2005 | Liberty et al. | |
| 2005/0174326 A1 | 8/2005 | Soh et al. | |
| 2005/0243062 A1* | 11/2005 | Liberty ............ | G06F 3/017 345/158 |
| 2006/0262116 A1 | 11/2006 | Moshiri et al. | |
| 2007/0035518 A1 | 2/2007 | Francz et al. | |
| 2007/0295089 A1 | 12/2007 | Velinsky et al. | |
| 2009/0033807 A1* | 2/2009 | Sheng ............ | H04N 5/4403 348/734 |
| 2009/0058799 A1 | 3/2009 | Huang et al. | |
| 2009/0203445 A1 | 8/2009 | Dohta et al. | |
| 2010/0005885 A1 | 1/2010 | Peters et al. | |
| 2010/0103095 A1 | 4/2010 | Yamamoto et al. | |
| 2010/0113151 A1 | 5/2010 | Yamashita et al. | |
| 2010/0245238 A1 | 9/2010 | Kumagai et al. | |

FOREIGN PATENT DOCUMENTS

| | | |
|---|---|---|
| WO | WO-2009/156476 | 12/2009 |
| WO | WO-2010/002997 | 1/2010 |

OTHER PUBLICATIONS

"Chinese Office Action", Chinese Application No. 201180035248.6, dated Apr. 21, 2015, 6 pages.

"Extended European Search Report", European Application No. 11790455, dated Jan. 5, 2016.

"International Preliminary Report on Patentability", PCT/US2011/039047, dated Dec. 13, 2012, 5 pages.

"International Search Report and Written Opinion", PCT/US2011/039047, dated Feb. 9, 2012, 7 pages.

"Korean Office Action", Korean Application No. 10-2013-7000093, dated Nov. 14, 2016.

* cited by examiner

DETERMINING FORWARD POINTING DIRECTION OF A HANDHELD DEVICE

RELATED APPLICATIONS

This application is a Continuation of U.S. patent application Ser. No. 14/951,858, filed on Nov. 25, 2015, which is a Continuation of U.S. patent application Ser. No. 13/701,156, filed on Dec. 20, 2012, now U.S. Pat. No. 9,201,516, which is the National Stage of International Application No. PCT/US2011/039047, filed on Jun. 3, 2011, which is related to, and claims priority from, U.S. Provisional Patent Application No. 61/351,108, filed on Jun. 3, 2010, entitled "Method of Computing a Dynamic Forward Direction", the disclosures of which are incorporated herein by reference.

BACKGROUND

The present invention describes forward pointing determination techniques, systems, software and devices, which can be used in 3D pointing devices, as well as in other types of devices.

Technologies associated with the communication of information have evolved rapidly over the last several decades. Television, cellular telephony, the Internet and optical communication techniques (to name just a few things) combine to inundate consumers with available information and entertainment options. Taking television as an example, the last three decades have seen the introduction of cable television service, satellite television service, pay-per-view movies and video-on-demand. Whereas television viewers of the 1960s could typically receive perhaps four or five over-the-air TV channels on their television sets, today's TV watchers have the opportunity to select from hundreds, thousands, and potentially millions of channels of shows and information. Video-on-demand technology, currently used primarily in hotels and the like, provides the potential for in-home entertainment selection from among thousands of movie titles.

The technological ability to provide so much information and content to end users provides both opportunities and challenges to system designers and service providers. One challenge is that while end users typically prefer having more choices rather than fewer, this preference is counterweighted by their desire that the selection process be both fast and simple. Unfortunately, the development of the systems and interfaces by which end users access media items has resulted in selection processes which are neither fast nor simple. Consider again the example of television programs. When television was in its infancy, determining which program to watch was a relatively simple process primarily due to the small number of choices. One would consult a printed guide which was formatted, for example, as series of columns and rows which showed the correspondence between (1) nearby television channels, (2) programs being transmitted on those channels and (3) date and time. The television was tuned to the desired channel by adjusting a tuner knob and the viewer watched the selected program. Later, remote control devices were introduced that permitted viewers to tune the television from a distance. This addition to the user-television interface created the phenomenon known as "channel surfing" whereby a viewer could rapidly view short segments being broadcast on a number of channels to quickly learn what programs were available at any given time.

Figure 1:
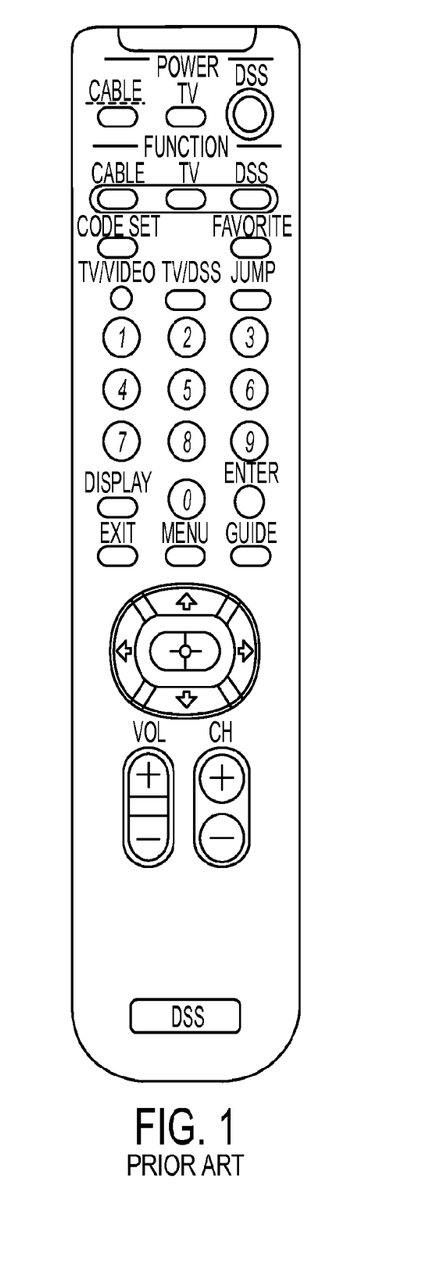
FIG. 1 depicts a conventional remote control unit for an entertainment system.

Despite the fact that the number of channels and amount of viewable content has dramatically increased, the generally available user interface, control device options and frameworks for televisions has not changed much over the last 30 years. Printed guides are still the most prevalent mechanism for conveying programming information. The multiple button remote control with up and down arrows is still the most prevalent channel/content selection mechanism. The reaction of those who design and implement the TV user interface to the increase in available media content has been a straightforward extension of the existing selection procedures and interface objects. Thus, the number of rows in the printed guides has been increased to accommodate more channels. The number of buttons on the remote control devices has been increased to support additional functionality and content handling, e.g., as shown in FIG. 1. However, this approach has significantly increased both the time required for a viewer to review the available information and the complexity of actions required to implement a selection. Arguably, the cumbersome nature of the existing interface has hampered commercial implementation of some services, e.g., video-on-demand, since consumers are resistant to new services that will add complexity to an interface that they view as already too slow and complex.

In addition to increases in bandwidth and content, the user interface bottleneck problem is being exacerbated by the aggregation of technologies. Consumers are reacting positively to having the option of buying integrated systems rather than a number of segregable components. An example of this trend is the combination television/VCR/DVD in which three previously independent components are frequently sold today as an integrated unit. This trend is likely to continue, potentially with an end result that most if not all of the communication devices currently found in the household will be packaged together as an integrated unit, e.g., a television/VCR/DVD/internet access/radio/stereo unit. Even those who continue to buy separate components will likely desire seamless control of, and interworking between, the separate components. With this increased aggregation comes the potential for more complexity in the user interface. For example, when so-called "universal" remote units were introduced, e.g., to combine the functionality of TV remote units and VCR remote units, the number of buttons on these universal remote units was typically more than the number of buttons on either the TV remote unit or VCR remote unit individually. This added number of buttons and functionality makes it very difficult to control anything but the simplest aspects of a TV or VCR without hunting for exactly the right button on the remote. Many times, these universal remotes do not provide enough buttons to access many levels of control or features unique to certain TVs. In these cases, the original device remote unit is still needed, and the original hassle of handling multiple remotes remains due to user interface issues arising from the complexity of aggregation. Some remote units have addressed this problem by adding "soft" buttons that can be programmed with the expert commands. These soft buttons sometimes have accompanying LCD displays to indicate their action. These too have the flaw that they are difficult to use without looking away from the TV to the remote control. Yet another flaw in these remote units is the use of modes in an attempt to reduce the number of buttons. In these "moded" universal remote units, a special button exists to select whether the remote should communicate with the TV, DVD player, cable set-top box, VCR, etc. This causes many usability issues including sending commands to the wrong device, forcing the user to look at the remote to make sure that it is in the right mode, and it does not provide any simplification to the integration of multiple devices. The most advanced of these universal remote units provide some integration by allowing the user to program sequences of commands to multiple devices into the remote. This is such a difficult task that many users hire professional installers to program their universal remote units.

Some attempts have also been made to modernize the screen interface between end users and media systems. However, these attempts typically suffer from, among other drawbacks, an inability to easily scale between large collections of media items and small collections of media items. For example, interfaces which rely on lists of items may work well for small collections of media items, but are tedious to browse for large collections of media items. Interfaces which rely on hierarchical navigation (e.g., tree structures) may be speedier to traverse than list interfaces for large collections of media items, but are not readily adaptable to small collections of media items. Additionally, users tend to lose interest in selection processes wherein the user has to move through three or more layers in a tree structure. For all of these cases, current remote units make this selection processor even more tedious by forcing the user to repeatedly depress the up and down buttons to navigate the list or hierarchies. When selection skipping controls are available such as page up and page down, the user usually has to look at the remote to find these special buttons or be trained to know that they even exist. Accordingly, organizing frameworks, techniques and systems which simplify the control and screen interface between users and media systems as well as accelerate the selection process, while at the same time permitting service providers to take advantage of the increases in available bandwidth to end user equipment by facilitating the supply of a large number of media items and new services to the user have been proposed in U.S. patent application Ser. No. 10/768,432, filed on Jan. 30, 2004, entitled "A Control Framework with a Zoomable Graphical User Interface for Organizing, Selecting and Launching Media Items", the disclosure of which is incorporated here by reference.

Of particular interest for this specification are the remote devices usable to interact with such frameworks, as well as other applications and systems. As mentioned in the above-incorporated application, various different types of remote devices can be used with such frameworks including, for example, trackballs, "mouse"-type pointing devices, light pens, etc. However, another category of remote devices which can be used with such frameworks (and other applications) is 3D pointing devices. The phrase "3D pointing" is used in this specification to refer to the ability of an input device to move in three (or more) dimensions in the air in front of, e.g., a display screen, and the corresponding ability of the user interface to translate those motions directly into user interface commands, e.g., movement of a cursor on the display screen. The transfer of data between the 3D pointing device may be performed wirelessly or via a wire connecting the 3D pointing device to another device. Thus "3D pointing" differs from, e.g., conventional computer mouse pointing techniques which use a surface, e.g., a desk surface or mousepad, as a proxy surface from which relative movement of the mouse is translated into cursor movement on the computer display screen. An example of a 3D pointing device can be found in U.S. Pat. No. 7,158,118 to Matthew G. Liberty (hereafter referred to as the '118 patent), the disclosure of which is incorporated here by reference.

Pointing devices, such as a laser pointer or the exemplary 3D pointing devices described in the '118 patent, typically have a forward direction of pointing that is determined or indicated by their mechanical product design or form factors. For example, the housing associated with the 3D pointing device can be designed such that a user will typically grasp the device in a predetermined way, such that a particular point or locus of points associated with a predetermined "front" of the device will generally be pointed at a screen or display to control movement of a cursor. However, despite designs which are intended to motivate users to hold the pointing devices in a predetermined way, some users may not uniformly hold these devices in the predetermined manner and the actual, forward pointing direction of the device may then differ in operation from its designed forward pointing direction. To the extent that the designed forward pointing direction is assumed to be the actual forward pointing direction, e.g., for various processing of algorithms to determine cursor movement or other factors, this unanticipated usage of the pointing device may introduce inaccuracies into the cursor movement or may require other tracking or compensation.

Accordingly, there is still room for improvement in the area of handheld device design, generally, and 3D pointer design, more specifically.

SUMMARY

A forward pointing direction associated with a handheld device is estimated or determined by, for example, calculating a center of rotation of the device. A resultant combined or selected bias estimate may then be used to compensate the biased output of the sensor in, e.g., a 3D pointing device.

According to an exemplary embodiment, a method for determining a forward pointing direction of a device includes the steps of: receiving, by a processor, sensor outputs associated with linear acceleration and angular velocity of the device, and determining, by the processor, the forward pointing direction of the device using the linear acceleration and angular velocity. The method can further include the step of computing a center of rotation of the device and using the center of rotation to determine the forward pointing direction of the device.

According to another exemplary embodiment, a device includes an accelerometer for sensing an acceleration of the device and outputting at least one acceleration output associated therewith, at least one angular velocity sensor for sensing rotation of the device and outputting at least one angular velocity output associated therewith, and a processing unit for processing the acceleration output and the at least one angular velocity output to determine a forward pointing direction of the device.

According to another embodiment, a device includes an accelerometer configured to sense an acceleration of the device and to output at least one acceleration output associated therewith, and at least one sensor configured to sense rotation of the device and to output at least one angular velocity output associated therewith, and a processing unit configured to process the acceleration output and the at least one angular velocity output to determine a forward pointing direction of the device, wherein the determination of the forward pointing direction of the device is based on a calculation of a center of rotation of said device using the processed outputs and a gravitational constant, wherein the calculation uses: an angular velocity matrix based upon the angular velocity output; an angular acceleration matrix based upon the angular velocity output; a direction cosine matrix based upon the angular velocity matrix and the angular acceleration matrix for defining the device frame of reference relative to an earth frame of reference; and a linear acceleration based on the acceleration output.

According to yet another exemplary embodiment, a device includes an accelerometer, at least one other sensor, and a processor configured to estimate a direction cosine matrix which defines a body frame of reference of the device relative to a user frame of reference of the device using outputs from the accelerometer and the at least one other sensor. The at least one other sensor can, for example, be a magnetometer, a gyroscope, a rotational sensor or any combination of these sensors.

According to yet another exemplary embodiment, a system includes an accelerometer, at least one other sensor, and a processor configured to estimate a direction cosine matrix which defines a body frame of reference of the device relative to a user frame of reference of the device using outputs from the accelerometer and the at least one other sensor. The at least one other sensor can, for example, be a magnetometer, a gyroscope, a rotational sensor or any combination of these sensors. The accelerometer and the at least one other sensor can be disposed in a housing of a handheld device. The processor can be located in the same housing within the handheld device or can be disposed in another device, e.g., a system controller or a game console, and can then receive outputs from the accelerometer and the at least one other sensor from which the direction cosine matrix (or other parameter which is usable to determine a forward pointing direction of the handheld device) is calculated.

BRIEF DESCRIPTION OF THE DRAWINGS

The accompanying drawings illustrate exemplary embodiments, wherein.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Exemplary embodiments enable devices, e.g., pointing devices or 3D pointing devices (including devices which may have as one auxiliary function to operate to provide a pointing input, e.g., remote controls, mobile phones, handheld computing devices, etc.) to automatically and dynamically determine an optimal forward direction of pointing based upon how the operator uses the device. By determining the forward direction dynamically, the device's performance can be improved. The system interprets how each operator uses the device rather than relying solely on an inflexible, predetermined design. However it should be noted that such embodiments can be used in conjunction with mechanical designs which also indicate to a user a preferred (or potential) forward pointing direction, while also being useful in devices having mechanical designs without an obvious forward pointing direction, e.g., a spherically shaped (ball) housing.

Prior to discussing these exemplary embodiments in detail, and in order to provide some context for this discussion, an exemplary aggregated media system 200 in which the present invention can be implemented will first be described with respect to FIG. 2. Those skilled in the art will appreciate, however, that the present invention is not restricted to implementation in this type of media system and that more or fewer components can be included therein. Therein, an input/output (I/O) bus 210 connects the system components in the media system 200 together. The I/O bus 210 represents any of a number of different of mechanisms and techniques for routing signals between the media system components. For example, the I/O bus 210 may include an appropriate number of independent audio "patch" cables that route audio signals, coaxial cables that route video signals, two-wire serial lines or infrared or radio frequency transceivers that route control signals, optical fiber or any other routing mechanisms that route other types of signals.

In this exemplary embodiment, the media system 200 includes a television/monitor 212, a video cassette recorder (VCR) 214, digital video disk (DVD) recorder/playback device 216, audio/video tuner 218 and compact disk player 220 coupled to the I/O bus 210. The VCR 214, DVD 216 and compact disk player 220 may be single disk or single cassette devices, or alternatively may be multiple disk or multiple cassette devices. They may be independent units or integrated together. In addition, the media system 200 includes a microphone/speaker system 222, video camera 224 and a wireless I/O control device 226. According to exemplary embodiments of the present invention, the wireless I/O control device 226 is a 3D pointing device according to one of the exemplary embodiments described below. The wireless I/O control device 226 can communicate with the entertainment system 200 using, e.g., an IR or RF transmitter or transceiver. Alternatively, the I/O control device can be connected to the entertainment system 200 via a wire.

The entertainment system 200 also includes a system controller 228. According to one exemplary embodiment of the present invention, the system controller 228 operates to store and display entertainment system data available from a plurality of entertainment system data sources and to control a wide variety of features associated with each of the system components. As shown in FIG. 2, system controller 228 is coupled, either directly or indirectly, to each of the system components, as necessary, through I/O bus 210. In one exemplary embodiment, in addition to or in place of I/O bus 210, system controller 228 is configured with a wireless communication transmitter (or transceiver), which is capable of communicating with the system components via IR signals or RF signals. Regardless of the control medium, the system controller 228 is configured to control the media components of the media system 200 via a graphical user interface described below.

Figure 2:
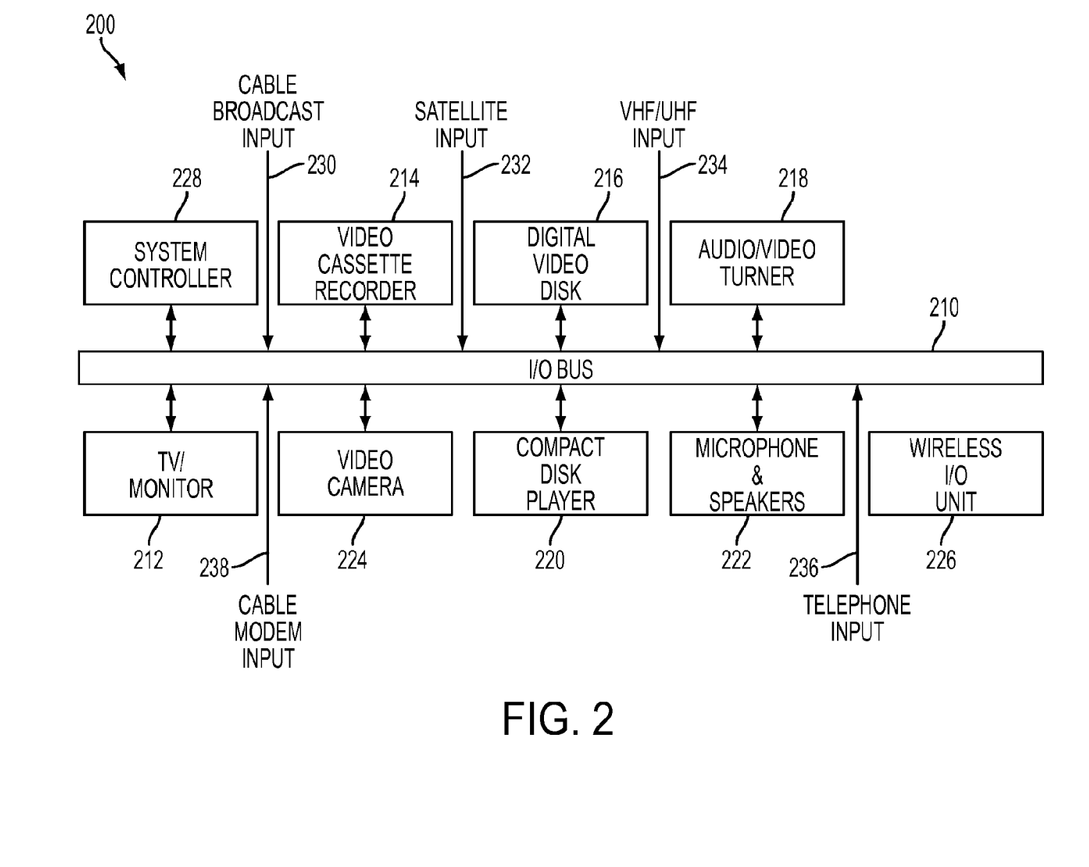
FIG. 2 depicts an exemplary media system in which exemplary embodiments can be implemented.

As further illustrated in FIG. 2, media system 200 may be configured to receive media items from various media sources and service providers. In this exemplary embodiment, media system 200 receives media input from and, optionally, sends information to, any or all of the following sources: cable broadcast 230, satellite broadcast 232 (e.g., via a satellite dish), very high frequency (VHF) or ultra high frequency (UHF) radio frequency communication of the broadcast television networks 234 (e.g., via an aerial antenna), telephone network 236 and cable modem 238 (or another source of Internet content). Those skilled in the art will appreciate that the media components and media sources illustrated and described with respect to FIG. 2 are purely exemplary and that media system 200 may include more or fewer of both. For example, other types of inputs to the system include AM/FM radio and satellite radio.

More details regarding this exemplary entertainment system and frameworks associated therewith can be found in the above-incorporated by reference U.S. Patent Application "A Control Framework with a Zoomable Graphical User Interface for Organizing, Selecting and Launching Media Items". Alternatively, remote devices in accordance with the present invention can be used in conjunction with other systems, for example computer systems including, e.g., a display, a processor and a memory system or with various other systems and applications.

Figure 3:
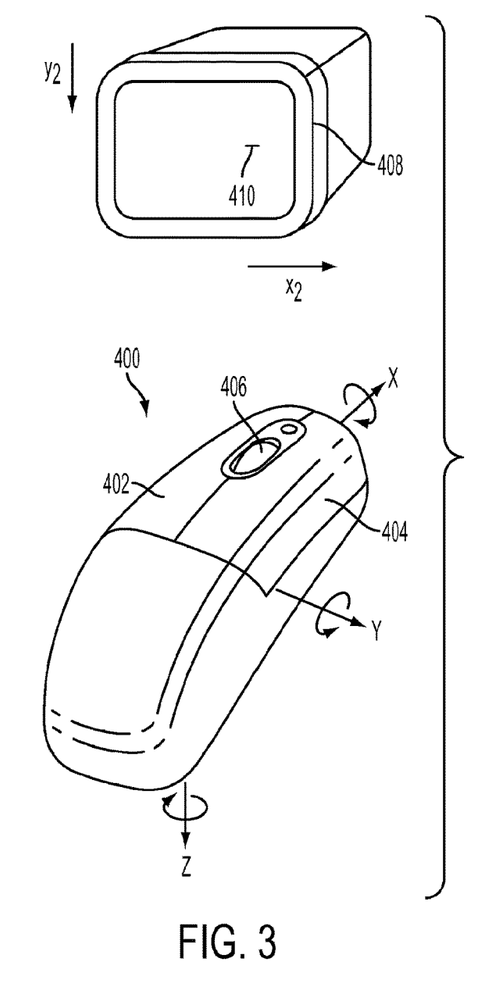
FIG. 3 shows a 3D pointing device according to an exemplary embodiment of the present invention.

As mentioned in the Background section, remote devices which operate as 3D pointers are of particular interest for the present specification, although embodiments are not limited to implementation in 3D pointing devices. Such 3D pointing devices enable the translation of movement, e.g., gestures or pointing, into commands to a user interface. An exemplary 3D pointing device 400 is depicted in FIG. 3. Therein, user movement of the 3D pointing can be defined, for example, in terms of a combination of x-axis attitude (roll), y-axis elevation (pitch) and/or z-axis heading (yaw) motion of the 3D pointing device 400. In addition, some exemplary embodiments of the present invention can also measure linear movement of the 3D pointing device 400 along the x, y, and z axes to generate cursor movement or other user interface commands. In the exemplary embodiment of FIG. 3, the 3D pointing device 400 includes two buttons 402 and 404 as well as a scroll wheel 406, although other exemplary embodiments will include other physical configurations. According to exemplary embodiments of the present invention, it is anticipated that 3D pointing devices 400 will be held by a user in front of a display 408 and that motion of the 3D pointing device 400 will be translated by the 3D pointing device into output which is usable to interact with the information displayed on display 408, e.g., to move the cursor 410 on the display 408. For example, rotation of the 3D pointing device 400 about the y-axis can be sensed by the 3D pointing device 400 and translated into an output usable by the system to move cursor 410 along the $y_2$ axis of the display 408. Likewise, rotation of the 3D pointing device 408 about the z-axis can be sensed by the 3D pointing device 400 and translated into an output usable by the system to move cursor 410 along the $x_2$ axis of the display 408. It will be appreciated that the output of 3D pointing device 400 can be used to interact with the display 408 in a number of ways other than (or in addition to) cursor movement, for example it can control cursor fading, volume or media transport (play, pause, fast-forward and rewind). Input commands may include operations in addition to cursor movement, for example, a zoom in or zoom out on a particular region of a display. A cursor may or may not be visible. Similarly, rotation of the 3D pointing device 400 sensed about the x-axis of 3D pointing device 400 can be used in addition to, or as an alternative to, y-axis and/or z-axis rotation to provide input to a user interface.

Figure 4:
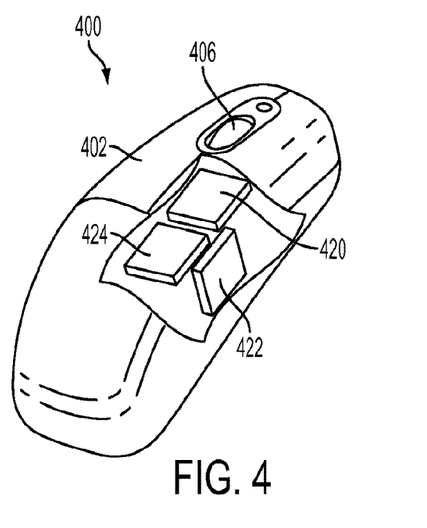
FIG. 4 illustrates a cutaway view of the 3D pointing device in FIG. 4 including two rotational sensors and one accelerometer.

According to one purely illustrative exemplary embodiment of the present invention, two rotational sensors 420 and 422 and one accelerometer 424 can be employed as sensors in 3D pointing device 400 as shown in FIG. 4. Although this exemplary embodiment employs inertial sensors it will be appreciated that the present invention is not so limited and examples of other types of sensors which can be used in conjunction with other exemplary embodiments are provided below. The rotational sensors 420 and 422 can, for example, be implemented using ADXRS150 or ADXRS401 sensors made by Analog Devices. It will be appreciated by those skilled in the art that other types of rotational sensors can be employed as rotational sensors 420 and 422 and that the ADXRS150 and ADXRS401 are purely used as an illustrative example. Unlike traditional gyroscopes, these rotational sensors use MEMS technology to provide a resonating mass which is attached to a frame so that it can resonate only along one direction. The resonating mass is displaced when the body to which the sensor is affixed is rotated around the sensor's sensing axis. This displacement can be measured using the Coriolis acceleration effect to determine an angular velocity associated with rotation along the sensing axis. If the rotational sensors 420 and 422 have a single sensing axis (as for example the ADXRS150s), then they can be mounted in the 3D pointing device 400 such that their sensing axes are aligned with the rotations to be measured. For this exemplary embodiment of the present invention, this means that rotational sensor 422 is mounted such that its sensing axis is parallel to the y-axis and that rotational sensor 420 is mounted such that its sensing axis is parallel to the z-axis as shown in FIG. 4. It will be appreciated that different sensor packages may be available which could lead to other exemplary implementations. For example, the two 1-D rotational sensors 420 and 422 could be replaced by a single, 2D rotational sensor package which provides outputs of rotational motion along, e.g., the y and z axes. One exemplary 3-D rotational sensor is the Invensense MPU-3000, although it will be appreciated that other sensors/sensor packages may also be used. There are also sensor packages that have multiple sensor types in the same package, such as the Invensense MPU-6000 which has a 3-axis rotation sensor and a 3-axis accelerometer. The rotational sensors 420, 422 can be 1-D, 2-D or 3-D sensors. The accelerometer 424 can, for example, be a 3-axis linear accelerometer, although a 2-axis linear accelerometer could be used by assuming that the device is measuring gravity and mathematically computing the remaining $3^{rd}$ value. Additionally, the accelerometer(s) and rotational sensor(s) could be packaged together into a single sensor package. A magnetometer (not shown) could be added to the sensor suite, or could replace one or more of the illustrated sensors. The components could be discrete, physical components, or fully or partially integrated with one another. Additional details are provided below with respect to FIG. 9. Other variations of sensors and sensor packages may also be used in conjunction with these exemplary embodiments.

Figure 5:
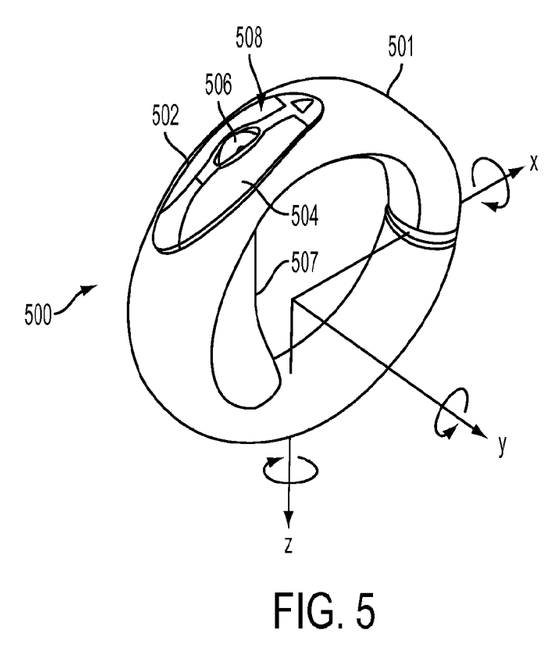
FIG. 5 shows a 3D pointing device according to another exemplary embodiment.
Figure 6:
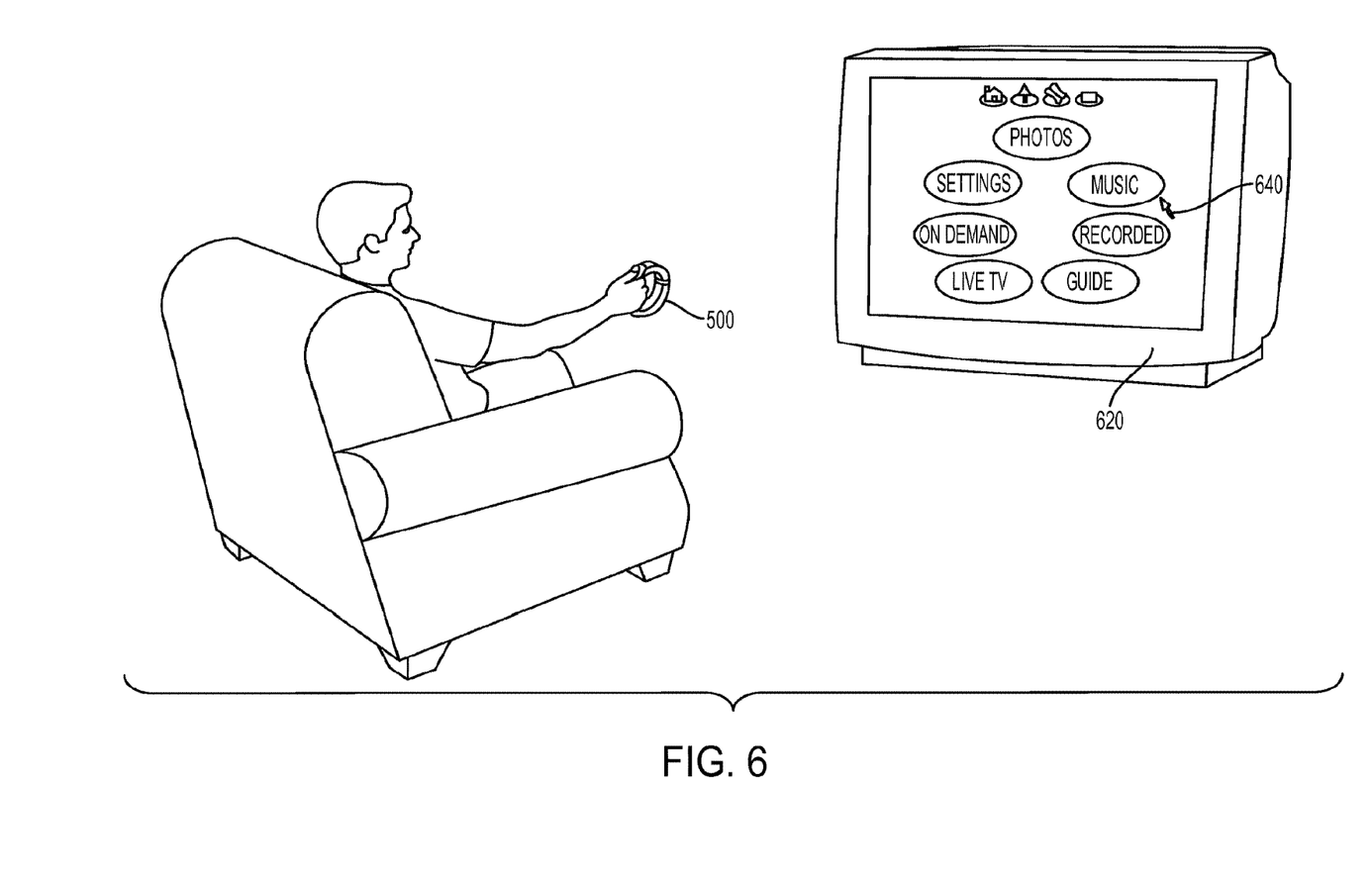
FIG. 6 depicts the 3D pointing device of FIG. 5 being used as part of a "10 foot" interface according to an exemplary embodiment.

The exemplary embodiments are not limited to the industrial design illustrated in FIGS. 3 and 4, but can instead be deployed in any industrial form factor, another example of which is illustrated as FIG. 5. In the exemplary embodiment of FIG. 5, the 3D pointing device 500 includes a ring-shaped housing 501, two buttons 502 and 504 as well as a scroll wheel 506 and grip 507, although other exemplary embodiments may include other physical configurations. The region 508 which includes the two buttons 502 and 504 and scroll wheel 506 is referred to herein as the "control area" 508, which is disposed on an outer portion of the ring-shaped housing 501. More details regarding this exemplary embodiment can be found in U.S. patent application Ser. No. 11/480,662, entitled "3D Pointing Devices", filed on Jul. 3, 2006, the disclosure of which is incorporated here by reference. Such devices have numerous applications including, for example, usage in the so-called "10 foot" interface between a sofa and a television in the typical living room as shown in FIG. 6. Therein, as the 3D pointing device 500 moves between different positions, that movement is detected by one or more sensors within 3D pointing device 200 and transmitted to the television 620 (or associated system component, e.g., a set-top box (not shown)). Movement of the 3D pointing device 500 can, for example, be translated into movement of a cursor 640 displayed on the television 620 and which is used to interact with a user interface. Details of an exemplary user interface with which the user can interact via 3D pointing device 500 can be found, for example, in the above-incorporated U.S. patent application Ser. No. 10/768,432 as well as U.S. patent application Ser. No. 11/437,215, entitled "Global Navigation Objects in User Interfaces", filed on May 19, 2006, the disclosure of which is incorporated here by reference.

One challenge faced in implementing exemplary 3D pointing devices 400 in accordance with these exemplary embodiments is to employ components, e.g., rotational sensors 502 and 504, which are not too costly, while at the same time providing a high degree of correlation between movement of the 3D pointing device 400, a user's expectation regarding how the user interface will react to that particular movement of the 3D pointing device and actual user interface performance in response to that movement. For example, if the 3D pointing device 400 is not moving, the user will likely expect that the cursor ought not to be drifting across the screen. Likewise, if the user rotates the 3D pointing device 400 purely around the y-axis, she or he would likely not expect to see the resulting cursor movement on display 408 contain any significant x-axis component.

To achieve these, and other, aspects of exemplary embodiments of the present invention, various measurements and calculations are performed, e.g., by the handheld device 400, which are used to adjust the outputs of one or more of the sensors 420, 422 and 424 and/or as part of the input used by a processor to determine an appropriate output for the user interface based on the outputs of the sensors 420, 422 and 424. These measurements and calculations are used to compensate for factors which fall broadly into two categories: (1) factors which are intrinsic to the 3D pointing device 400, e.g., errors associated with the particular sensors 420, 422 and 424 used in the device 400 or the way in which the sensors are mounted in the device 400 and (2) factors which are not intrinsic to the 3D pointing device 400, but are instead associated with the manner in which a user is using the 3D pointing device 400, e.g., linear acceleration, tilt, and tremor. Some exemplary techniques for handling these effects are described in the above-incorporated by reference '118 patent. While the '118 patent describes an exemplary technique for compensating for a user's tilt of a device, the tilt compensation mechanism described therein still presumes that the user is generally pointing using a predesigned "front" end of the device. However the following exemplary embodiments provide additional techniques for dynamically determining the forward pointing direction of a device allowing the user to hold the device in any orientation, e.g., a sphere which could be picked up with any point on the spherical surface being the "forward pointing direction", e.g., always pointing away from the user's wrist. This allows for more comfortable use of the device, use of devices which might not have implied directions, or use devices that have multiple orientations that might be appropriate for holding.

Tilt compensation as described in the '118 patent and dynamic forward direction according to exemplary embodiments described below are complementary to one another. Tilt compensation allows the device to freely rotate around the forward pointing direction without changing the pointing operation. Dynamic forward direction determination allows a user to hold the object in any orientation, and have it work in the same manner. Rotations have 3 degrees of freedom (i.e. yaw, pitch and roll in an Euler representation), so tilt compensations typically allows for changes to one dimension (i.e. roll), while dynamic forward direction determination as described below allows for changes to all three dimensions.

Dynamic Forward Pointing Direction Determination

Figure 7:
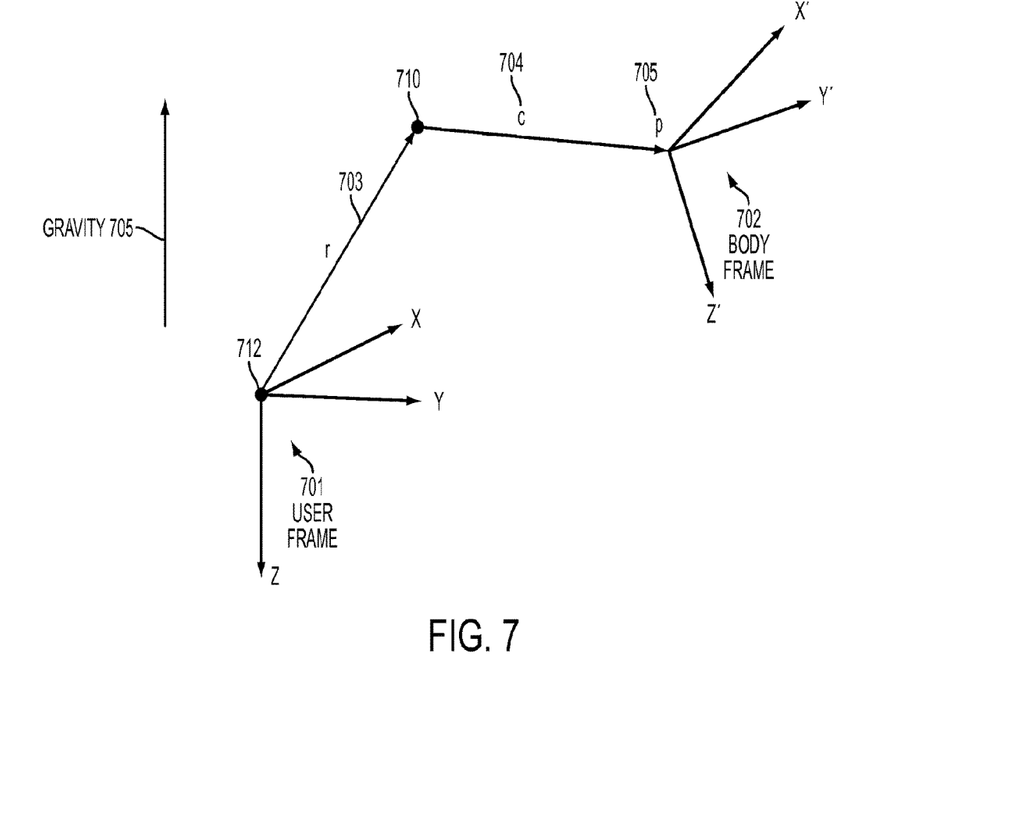
FIG. 7 depicts an exemplary relationship between a user frame of reference, a center of rotation, and a body frame of reference which can be used in determining a forward pointing direction according to an embodiment.

Turning now to an exemplary embodiment for dynamically determining a forward pointing direction of a device, e.g., a remote control or 3D pointing device, consider that the remote control 400, 500 (or another having a different industrial design) moves through space as shown in FIG. 7. The fixed user frame 701 associated with the remote control can be arbitrarily determined, but the present embodiment presumes that the gravity vector 705 aligns to the user-frame z-axis. Often, the user-frame x-axis is aligned to magnetic north. The remote control in this example moves linearly through space as represented by vector r 703. Typically vector r 703 typically represents the location of the operator's wrist. The remote control device is located at a vector c 704 away from the center of rotation and resides at point p 705 which is also the origin of the remote control body frame 702. The vector c is presumed to be the desired forward direction of pointing.

The nomenclature, axes and variables illustrated in FIG. 7 will be used in the following paragraphs to illustrate various algorithms and mathematical approaches which embodiments can employ to dynamically determine the forward direction of rotation of a device. Additionally, the following notational conventions are defined for the subsequent algorithmic discussion:

Lower case letters represent scalar variables: x, y, z
Lower case bold letters represent vectors: x, y, z
Upper case bold letters represent matrices: X, Y, Z
Vectors are assumed to be column vectors (N×1 matrix)
x y=x·y is the dot product of vectors x and y
$\|v\|=\sqrt{v \cdot v}$ is the magnitude of vector v
x×y is the cross product of vectors x and y
$v^{\otimes}$ is the cross product matrix $$v^{\otimes} = \begin{bmatrix} 0 & -v_z & v_y \\ v_z & 0 & -v_x \\ -v_y & v_x & 0 \end{bmatrix}$$

X y is the matrix multiplication of matrix X and vector y
$X^T$ is the matrix transpose
I is an identity matrix $$\begin{bmatrix} 1 & 0 & 0 \\ 0 & 1 & 0 \\ 0 & 0 & 1 \end{bmatrix}$$

$$\hat{y} = \frac{y}{\|y\|}$$

is the unit vector in the direction of y $<q_0, v>$ is the quaternion with scalar component $q_0$ and the length 3 vector v Vector(q)=v where q is the quaternion $<q_0, v>$ $q \otimes p$ is the quaternion multiplication of q and p $q^*$ is the quaternion conjugate of q: $<q_0, v>^* = <q_0, -v>$ $^b x$ is the vector x defined in body-frame coordinates $^u x$ is the vector x defined in user-frame coordinates Length 2 vector v is assumed to have subcomponents named $(v_x, v_y)$ Length 3 vector v is assumed to have subcomponents named $(v_x, v_y, v_z)$ $\dot{v}$ is the derivative of v $\ddot{v}$ is the second derivative of v According to an exemplary embodiment, the remote control measures the motion of the device using the sensors described above (or other sensor packages). The motion processing algorithm being executed by the processor (either in the handheld device itself or in another device in communication with the handheld device) can then converts the raw sensor data into more meaningful forms, such as SI units. The motion processing may remove undesirable sensor characteristics including one or more of variable bias offset (zero rate offset, zero-g offset, zero gauss offset), cross-axis effects, scale variations, non-linearities, temperature effects, and aging effects.

The motion processing then collects data while the user is moving the device to determine the center of rotation. For this exemplary, it is assumed that a single center of rotation exists, although these techniques can be extended to cover situations where multiple centers of rotation exist as will be described in more detail below. As mentioned above, the center of rotation 710 exists at a displacement r 703 from the user frame's origin 711. The remote control device then exists at a displacement c 704 from r 703. Let r be defined in the user frame as $^u r$ and c be defined in the body frame as $^b c$, where "u" refers to user frame of reference and "b" refers to body frame of reference. Let $$Q_{B \leftarrow U}$$

be the direction cosine matrix (DCM) that defines the body frame relative to the user frame. Then the location of the device, $^u p$ can be written as:

$$^u p = {^u r} + Q_{B \leftarrow U}^{Tb} c \quad (1)$$

By taking the derivative of the equation (1), we find $$^u \dot{p} = {^u \dot{r}} + \dot{Q}_{B \leftarrow U}^{Tb} c + Q_{B \leftarrow U}^{Tb} \dot{c} \quad (2)$$

By taking the derivate again, we find:

$$^u \ddot{p} = {^u \ddot{r}} + \ddot{Q}_{B \leftarrow U}^{Tb} c + 2 \dot{Q}_{B \leftarrow U}^{Tb} \dot{c} + Q_{B \leftarrow U}^{Tb} \ddot{c} \quad (3)$$

The linear acceleration $^b a$ measured by the remote control is given by:

$$^b a = Q_{B \leftarrow U} (^u \ddot{p} + {^u g}) \quad (4)$$

where $^u g$ is Earth's gravity, nominally $(0, 0, -9.8)$ m/s². Substituting $^u \ddot{p}$ into this equation yields:

$$^b a = Q_{B \leftarrow U} (^u \ddot{r} + {^u g}) + Q_{B \leftarrow U} \ddot{Q}_{B \leftarrow U}^{Tb} c + 2 Q_{B \leftarrow U} \dot{Q}_{B \leftarrow U}^{Tb} \dot{c} + {^b \ddot{c}} \quad (5)$$

The angular velocity matrix and angular acceleration matrix are defined as:

$$^b \Omega = Q_{B \leftarrow U} \dot{Q}_{B \leftarrow U}^T \quad (6)$$

$$^b \dot{\Omega} = \dot{Q}_{B \leftarrow U} \dot{Q}_{B \leftarrow U}^T + Q_{B \leftarrow U} \ddot{Q}_{B \leftarrow U}^T$$

where $$^b \Omega = \begin{pmatrix} 0 & -{^b \omega_z} & {^b \omega_y} \\ {^b \omega_z} & 0 & -{^b \omega_x} \\ -{^b \omega_y} & {^b \omega_x} & 0 \end{pmatrix}$$

$$^b \dot{\Omega} = \begin{pmatrix} 0 & -{^b \dot{\omega}_z} & {^b \dot{\omega}_y} \\ {^b \dot{\omega}_z} & 0 & -{^b \dot{\omega}_x} \\ -{^b \dot{\omega}_y} & {^b \dot{\omega}_x} & 0 \end{pmatrix}$$

$$^b \Omega^2 = \begin{pmatrix} -{^b \omega_y^2} - {^b \omega_z^2} & {^b \omega_x}{^b \omega_y} & {^b \omega_x}{^b \omega_z} \\ {^b \omega_x}{^b \omega_y} & -{^b \omega_x^2} - {^b \omega_z^2} & {^b \omega_y}{^b \omega_z} \\ {^b \omega_x}{^b \omega_z} & {^b \omega_y}{^b \omega_z} & -{^b \omega_x^2} - {^b \omega_y^2} \end{pmatrix}$$

By substitution we can find:

$$\dot{Q}_{B \leftarrow U}^T = Q_{B \leftarrow U}^{Tb} \Omega \quad (7)$$

$$\ddot{Q}_{B \leftarrow U} = \left( Q_{B \leftarrow U}^{Tb} \Omega \right)^T = {^b \Omega^T} Q_{B \leftarrow U} = -{^b \Omega} Q_{B \leftarrow U}$$

And then:

$$Q_{B \leftarrow U} \ddot{Q}_{B \leftarrow U}^T = {^b \dot{\Omega}} - \dot{Q}_{B \leftarrow U} \dot{Q}_{B \leftarrow U}^T \quad (8)$$

$$Q_{B \leftarrow U} \ddot{Q}_{B \leftarrow U}^T = {^b \dot{\Omega}} - \left( -{^b \Omega} Q_{B \leftarrow U} \right) \left( Q_{B \leftarrow U}^{Tb} \Omega \right)$$

-continued $$\underset{B \leftarrow U}{Q} \underset{B \leftarrow U}{\ddot{Q}}{}^T = {}^b\dot{\Omega} + {}^b\Omega^2$$

Substituting (8) back into the equation (4) for ${}^b a$ yields $${}^b a = \underset{B \leftarrow U}{Q}({}^u\ddot{r} + {}^u g) + \left({}^b\dot{\Omega} + {}^b\Omega^2\right){}^b c + 2{}^b\Omega{}^b\dot{c} + {}^b\ddot{c} \quad (9)$$

The motion processing unit then estimates ${}^b c$, which is the vector form the center of rotation to the origin of the body frame. Alternatively ${}^b c$ is the point of the center of rotation in body-frame coordinates. Numerous numerical methods exist to perform this estimation. Although not necessary, the present embodiment makes several assumptions to simplify computational complexity. Since ${}^u\ddot{r} \ll {}^u g$ on average, assume that ${}^u\ddot{r} = 0$. Since the motion processing is attempting to find a single, consistent center of rotation, assume that ${}^b\dot{c} = 0$ and ${}^b\ddot{c} = 0$. The equation (9) then simplifies to:

$${}^b a = \underset{B \leftarrow U}{Q}{}^u g + \left({}^b\dot{\Omega} + {}^b\Omega^2\right){}^b c \quad (10)$$

$${}^b c = \left({}^b\dot{\Omega} + {}^b\Omega^2\right)^{-1}\left({}^b a - \underset{B \leftarrow U}{Q}{}^u g\right)$$

This equation (10) loses precision as the quantity $({}^b\dot{\Omega} + {}^b\Omega^2)$ approaches zero or loses rank. In other words, this equation produces better estimates when the device is experiencing greater angular motions, either angular velocity or angular acceleration.

Using the measurement of angular velocity from, e.g., sensors 420, 422, the processor can compute ${}^b\dot{\Omega} + {}^b\Omega^2$. The value for $$\underset{B \leftarrow U}{Q}$$

can be computed using a traditional sensor fusion method. Multiple values for c can be combined to produce an estimate. The combination of multiple c values may occur, for example, using one or more of various methods including classical low-pass filtering, adaptive filtering, Kalman filtering or Bayesian filtering. The present embodiment uses a Kalman filter where the measurement error is computed from the magnitude of the ${}^b\dot{\Omega} + {}^b\Omega^2$ term.

The estimate for c which is calculated using, for example, equation (10) is presumed to be the desired forward direction of pointing. If the linear accelerometer is offset from the center of the device, the offset may be added to this value of c to account for the sensor displacement. Although the present embodiment performs the filtering on the length three vector c, other vector representations including spherical coordinates could be used.

The previous exemplary embodiment used the value for $$\underset{B \leftarrow U}{Q}$$

the calculation. In many motion devices, this value is not accurate. A second embodiment eliminates the dependency on $$\underset{B \leftarrow U}{Q}$$

by combining two different measurements separated by a short period of time. Since the system repeatedly measures ${}^b\Omega$, the system can compute the change in Q through integration. Using simple Euler integration, $$\underset{U \leftarrow B}{Q}(n) = \underset{U \leftarrow B}{Q}(n-1) + \underset{U \leftarrow B}{\dot{Q}}(n)\Delta t \quad (11)$$

$$\underset{U \leftarrow B}{Q}(n) = \underset{U \leftarrow B}{Q}(n-1) + {}^b\Omega^T \Delta t \underset{U \leftarrow B}{Q}(n-1)$$

$$\underset{B \leftarrow U}{Q}(n) = (I + {}^b\Omega^T \Delta t) \underset{B \leftarrow U}{Q}(n-1)$$

Those skilled in the art will note that this equation (11) also presumes a small angle approximation. The resulting integrated Q may not be fully normalized.

This second embodiment uses the average angular velocity to perform the integration which results in pseudo-trapezoidal integration:

$${}^b\Omega = \left(\frac{{}^b\Omega_1 + {}^b\Omega_2}{2}\right) \quad (12)$$

By capturing two measurements and using the average angular velocity to perform the integration, we have:

$${}^b a_1 = \underset{B \leftarrow U}{Q}{}^u g + \left({}^b\dot{\Omega}_1 + {}^b\Omega_1^2\right){}^b c \quad (13)$$

$${}^b a_2 = (I + {}^b\Omega^T \Delta t)\underset{B \leftarrow U}{Q}{}^u g + \left({}^b\dot{\Omega}_2 + {}^b\Omega_2^2\right){}^b c$$

By solving the first equation for Q, we find:

$$\underset{B \leftarrow U}{Q}{}^u g = {}^b a_1 - \left({}^b\dot{\Omega}_1 + {}^b\Omega_1^2\right){}^b c \quad (14)$$

Substituting this value into ${}^b a_2$ yields:

$${}^b a_2 = (I + {}^b\Omega^T \Delta t)({}^b a_1 - ({}^b\dot{\Omega}_1 + {}^b\Omega_1^2){}^b c) + ({}^b\dot{\Omega}_2 + {}^b\Omega_2^2){}^b c$$

$${}^b a_2 = (I + {}^b\Omega^T \Delta t){}^b a_1 - (I + {}^b\Omega^T \Delta t)({}^b\dot{\Omega}_1 + {}^b\Omega_1^2){}^b c + ({}^b\dot{\Omega}_2 + {}^b\Omega_2^2){}^b c$$

$${}^b a_2 = (I + {}^b\Omega^T \Delta t){}^b a_1 + (({}^b\dot{\Omega}_2 + {}^b\Omega_2^2) - (I + {}^b\Omega^T \Delta t)({}^b\dot{\Omega}_1 + {}^b\Omega_1^2)){}^b c$$

$${}^b c = (({}^b\dot{\Omega}_2 + {}^b\Omega_2^2) - (I + {}^b\Omega^T \Delta t)({}^b\dot{\Omega}_1 + {}^b\Omega_1^2))^{-1}({}^b a_2 - (I + {}^b\Omega^T \Delta t){}^b a_1) \quad (15)$$

which thus provides another technique for determining the center of rotation of the device ${}^b c$.

This formulation in equation (15) is more prone to measurement noise than the previous embodiment, but no longer depends upon the angular position estimate. Since the estimate of the forward direction of pointing is generally not time critical, additional filtering may be applied before this computation to minimize the error introduced by sensor noise. If filtering is applied, care should be taken to ensure that the different motion measurements are aligned in time.

The previous two embodiments used the center of rotation to determine the forward direction of pointing. A third embodiment uses the average angular position of the device to determine the forward direction of pointing. The forward direction could be dynamically optimized by using the short-term history of where the device is pointing in order to minimize pointing distortion and maximize resolution. Since the screen is of a fixed size, in the short term there will be a relatively fixed region of space that maps to the screen. With user-frame orientation compensation, the least distortion and maximum resolution is obtained when average pitch of the device is 0 and the average yaw of the device is 0. If the pitch of the forward direction is dynamically adjusted based on the short term history, then the average pitch can be set to always be near zero. The yaw can be determined in the same way. The estimate for c is computed such that the resulting coordinate transform discussed below maps c to the center of the screen.

For all three embodiments, the estimate for c, optionally adjusted by the sensor offset, can be used as the new forward direction of pointing. The motion processing then uses the new forward direction of pointing to adjust the remote control's coordinate system. The motion processing computes a coordinate rotation such that the original body-frame x-axis becomes the newly determine forward direction of pointing. This definition of the coordinate transform does not specify theta, the rotation angle about the new forward direction of pointing. When used within a system that is also an orientation compensation system, the value chosen for this rotation angle is of minimal effect. The present embodiment determines theta to minimize the amount of rotation around the newly determined forward direction of pointing. This new coordinate system is then used as the body-frame of reference for further cursor processing including orientation compensation, pointer response curves, gain adjustment, button motion suppression and pointer ballistics. The cursor processing may also include conversion to absolute coordinates and pointer alignment.

Once the motion processing described above is completed, the resulting cursor data is processed by the host machine, e.g., system controller 228 which is connected wirelessly or via wireline to the remote control device. The host machine typically includes an operating system that handles the cursor management. The host machine then displays the cursor on the display 212.

Numerous variations and permutations of the afore-described exemplary embodiments are possible and within the scope of the present invention. For example, although the center of rotation used to determine the forward direction of pointing in the afore-described embodiments is in the body frame of reference, the center of rotation calculation can alternatively be performed in the user frame. The motion processing system may also perform tremor cancellation. Additional sensors may be used including cameras, optical sensors (including triangulation, trilateration, multilateration, time difference of arrival and angular gradient), ultrasound (including triangulation, trilateration, multilateration, time difference of arrival and angular gradient), RF (including triangulation, trilateration, multilateration, time difference of arrival and angular gradient), magnetic fields (including triangulation, trilateration, multilateration, time difference of arrival and angular gradient), or any sensor system that can derive an estimate for $$Q_{B \leftarrow U}$$

or $\Omega$ and g.

The motion processing may be extended to calculate multiply linked rotation centers instead of a single center of rotation. The present embodiment presumes that a majority of angular motion occurs from the wrist, and the center of rotation should be very close to the user's wrist joint. Some users may use more motion of the elbow and shoulder. By calculating the multiply linked rotation centers, the estimate of the final wrist center can be more accurate. Most applications will still use the vector from the wrist center to the device as the forward direction of pointing, but other vectors may be selected to best match the desired application. The motion processing may be extended to differentiate the multiple centers of rotation and use them differently when calculating the dynamic forward direction. For example, by differentiating between finger movement and wrist rotation the wrist rotation will be in the pointing direction, and the finger movement will likely be perpendicular to the pointing direction.

Where Euler integration is used, alternative integration methods such as trapezoidal integration or polynomial integration could be used to improve the accuracy. Additional measurements may be made to determine if the assumptions are valid. If the assumptions are not valid, then the estimate can be ignore or given less weight. With additional processing complexity, the assumptions $^u\dot{r}=0$, $^b\dot{c}=0$ and $^b\ddot{c}=0$ need not be made. The equations are specified using direction cosine matrices (DCMs) to represent rotations. Other representations may be used including Euler angles, Pauli spin matrices, axis-angle and quaternions.

Although the afore-described embodiments refer to the device whose forward pointing direction is dynamically determine and that measures motion as a "remote control", it will be appreciated by those skilled in the art that the device could have any form factor or perform any function(s) in addition to pointing. The new coordinate system could generate the y-axis as the cross product of gravity $^bg$ and the forward direction of pointing $^bc$, which will work as long as $^bc$ is not in the direction of $^bg$.

Figure 8:
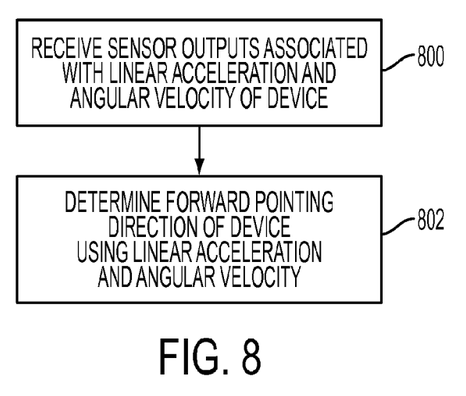
FIG. 8 is a flowchart illustrating an exemplary method for determining a forward pointing direction according to an embodiment.

Based on the foregoing, an exemplary method for determining a forward pointing direction of a handheld device can include the steps illustrated in the flow chart of FIG. 8. Therein, at step 800, a processor is configured to receive sensor outputs associated with linear acceleration of a device and angular velocity of the device. From these outputs, the processor is further configured to determine a forward pointing direction of the device at step 802. According to some exemplary embodiments, determining the forward pointing direction of the device involves calculating a center of rotation of the device, which is used to determine the forward pointing direction of the device by computing a vector between the center of rotation and an origin point of the body frame of reference of the device at step 802. According to other embodiments, other information can be used to derive the forward pointing direction of the device, e.g., the average angular position of the device.

Figure 9:
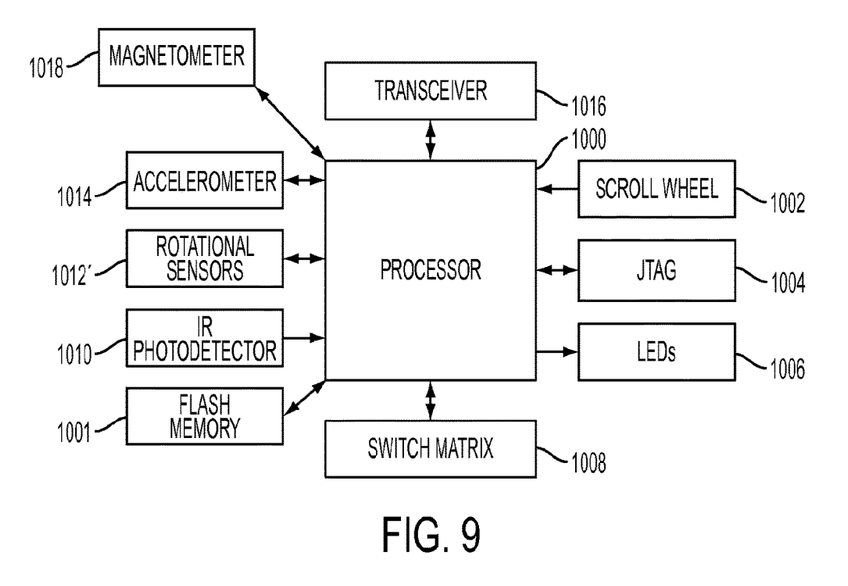
FIG. 9 illustrates hardware elements of a 3D pointing device according to an exemplary embodiment.

Having provided a description of dynamic forward pointing direction determination in exemplary 3D pointing devices according to the afore-described exemplary embodiments, FIG. 9 illustrates an exemplary hardware architecture associated with such 3D pointing devices. Therein, a processor 1000 communicates with other elements of the 3D pointing device including a flash memory 1001, scroll wheel 1002, JTAG 1004, LEDs 1006, switch matrix 1008, IR photodetector 1010, rotational sensor(s) 1012, accelerometer 1014 and transceiver 1016. The flash memory device 1001 can be used by processor 1000 to store various programs and/or data for use in operating the 3D pointing device, e.g., bias estimates as described above. The scroll wheel 1002 is an optional input component which enables a user to provide input to the interface by rotating the scroll wheel 1002 clockwise or counterclockwise. JTAG 1004 provides the programming and debugging interface to the processor. LEDs 1006 provide visual feedback to a user, for example, when a button is pressed. Switch matrix 1008 receives inputs, e.g., indications that a button on the 3D pointing device has been depressed or released, that are then passed on to processor 1000. The optional IR photodetector 1010 can be provided to enable the exemplary free space pointing device to learn IR codes from other remote controls. Rotational sensors 1012 provide readings to processor 1000 regarding, e.g., the y-axis and z-axis rotation (angular rate) of the 3D pointing device as described above. Accelerometer 1014 provides readings to processor 100 regarding the linear acceleration of the 3D pointing device which can be used, e.g., to perform tilt compensation and to compensate for errors which linear acceleration introduces into the rotational readings generated by rotational sensor(s) 1012, as well as to compute the forward pointing direction of the device as described above. Transceiver 1016 is used to communicate information to and from 3D pointing device, e.g., to the system controller 228 or to a processor associated with a computer. The transceiver 1016 can be a wireless transceiver, e.g., operating in accordance with the Bluetooth standards for short-range wireless communication or an infrared transceiver. Alternatively, 3D pointing device according to these exemplary embodiments can communicate with systems via a wireline connection. A magnetometer 1018 may also, optionally be included in the device either together with the accelerometer 1014 and rotational sensors 1012, or as a substitute for one or more of those sensors. The magnetometer can be used in multiple ways. Among these are to improve the calculation of $$Q_{B \leftarrow U},$$

to improve the gyroscope or rotational sensor measurements, or used to replace the gyroscope or rotational sensors by detecting changes in the magnetic field.

Systems and methods for processing data according to exemplary embodiments of the present invention can be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention. Such software may run on a processor which is housed within the device, e.g., a 3D pointing device or other device, which contains the sensors or the software may run on a processor or computer housed within another device, e.g., a system controller, a game console, a personal computer, etc., which is in communication with the device containing the sensors. In such a case, data may be transferred via wireline or wirelessly between the device containing the sensors and the device containing the processor which runs the software which performs the dynamic forward pointing direction estimation and compensation as described above. According to other exemplary embodiments, some of the processing described above with respect to forward pointing direction determination may be performed in the device containing the sensors, while the remainder of the processing is performed in a second device after receipt of the partially processed data from the device containing the sensors.

Although the foregoing exemplary embodiments relate to sensing packages including one or more rotational sensors and an accelerometer, forward pointing direction determination techniques according to these exemplary embodiments are not limited to only these types of sensors. Instead forward pointing direction determination estimation techniques as described herein can be applied to devices which include, for example, only accelerometer(s), optical and inertial sensors (e.g., a rotational sensor, a gyroscope or an accelerometer), a magnetometer and an inertial sensor (e.g., a rotational sensor, a gyroscope or an accelerometer), a magnetometer and an optical sensor, or other sensor combinations. Additionally, although exemplary embodiments described herein relate to forward pointing direction determination in the context of 3D pointing devices and applications, such techniques are not so limited and may be employed in methods and devices associated with other applications, e.g., medical applications, gaming, cameras, military applications, mobile phones, etc.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. An apparatus for determining a forward pointing direction of a device having a user interface, the apparatus comprising:
    an accelerometer for sensing an acceleration of the device and outputting at least one acceleration output;
    at least one sensor for sensing rotation of the device and outputting at least one angular velocity output; and
    a processor configured to process the acceleration output and the at least one angular velocity output to calculate a center of rotation of the device and determine the forward pointing direction of the device based on the determined center of rotation of the device.

2. The apparatus of claim 1 wherein the processor determines the forward pointing direction of the device as the vector from the center of rotation to the device.

3. The device of claim 1 wherein the calculation of the center of rotation of the device is further based on a gravitational constant.

4. The apparatus of claim 3, wherein the calculation of the center of rotation of the device uses:
    an angular velocity matrix based upon the angular velocity output;
    an angular acceleration matrix based upon the angular velocity output;

a direction cosine matrix based upon the angular velocity matrix and the angular acceleration matrix for defining the device frame of reference relative to an earth frame of reference; and a linear acceleration based on the acceleration output.

5. The apparatus of claim 1 wherein the processing comprises converting raw sensor data into International System (SI) unit data and wherein the SI unit data is filtered to remove undesirable sensor characteristics comprising at least one of variable bias offset, cross-axis effects, scale variations, non-linearities, temperature effects and aging effects.

6. The apparatus of claim 5 further comprising a radio frequency (RF) transmitter communicatively connected to the processing unit, wherein the RF transmitter is configured to transmit the forward pointing direction.

7. The apparatus of claim 1 wherein the at least one sensor is a rotational sensor.

8. The apparatus of claim 1 wherein the at least one sensor is a gyroscope.

9. The apparatus of claim 1 wherein said at least one sensor is a magnetometer.

10. The apparatus of claim 4 further comprising a magnetometer, wherein the processor is further configured to use the magnetometer to improve calculation of the direction cosine matrix.

11. The apparatus of claim 1 wherein the processor is further configured to adjust a position of an object on the user interface based on said calculation.

12. A method for determining a forward pointing direction of a device, the method comprising:

collecting data associated with the device's acceleration and rotation while the device is in motion; and calculating of a center of rotation of the device based on the collected data and determining the forward pointing direction of the device based on the calculated center of rotation of the device.

13. The method of claim 12 further comprising:

filtering the data to remove at least one sensor characteristic from a group of sensor characteristics comprising variable bias offset, cross-axis effects, scale variations, non-linearities, temperature effects and aging effects.

14. The method of claim 12 wherein the calculating of the center of rotation of the device comprises calculating:

$$^bc = (^b\dot{\Omega} + {}^b\Omega^2)\left({}^ba - \underset{B \to U}{Q} {}^ug\right),$$

where:

$^b\Omega^2$ is an angular acceleration matrix associated with the device in a body frame of reference, $^b\Omega^2$ is a square of an angular velocity matrix associated with the device in the body frame of reference, $^b\alpha$ is a linear acceleration associated with the device in the body frame of reference, $\underset{B \to U}{Q}$ is a direction cosine matrix defining the body frame of reference relative to a user frame of reference and $^ug$ is earth's gravitational constant associated with the user frame of reference.

15. The method of claim 14 wherein the $^b\Omega^2$ is:

$$^b\dot{\Omega} = \begin{pmatrix} 0 & -{}^b\dot{\omega}_z & {}^b\dot{\omega}_y \\ {}^b\dot{\omega}_z & 0 & -{}^b\dot{\omega}_x \\ -{}^b\dot{\omega}_y & {}^b\dot{\omega}_x & 0 \end{pmatrix},$$

where:

$^b\dot{\omega}_x$ is the x component of the angular acceleration of the device in the body frame of reference, $^b\dot{\omega}_x$ is the y component of the angular acceleration of the device in the body frame of reference and $^b\dot{\omega}_x$ is the z component of the angular acceleration of the device in the body frame of reference.

16. The method of claim 14 wherein the $^b\Omega^2$ is:

$$^b\Omega^2 = \begin{pmatrix} -{}^b\omega_y^2 - {}^b\omega_z^2 & {}^b\omega_z{}^b\omega_y & {}^b\omega_z{}^b\omega_z \\ {}^b\omega_x{}^b\omega_y & -{}^b\omega_z^2 - {}^b\omega_z^2 & {}^b\omega_y{}^b\omega_z \\ {}^b\omega_x{}^b\omega_z & {}^b\omega_y{}^b\omega_z & -{}^b\omega_z^2 - {}^b\omega_y^2 \end{pmatrix},$$

where:

$^b\omega_x$ is the x component of the angular velocity of the device in the body frame of reference, $^b\omega_y$ is the y component of the angular velocity of the device in the body frame of reference and $^b\omega_x$ is the z component of the angular velocity of the device in the body frame of reference.

17. The method of claim 14 wherein multiple calculations of the device's center of rotation vector are combined to optimize the center of rotation vector calculation.

18. The method of claim 17 wherein the center of rotation vector calculation result is offset based on an offset value of an accelerometer, associated with the device, from a center of the device.

19. The method of claim 12 wherein the calculating a center of rotation of the device comprises calculating:

$^bc = (({}^b\dot{\Omega}_2 + {}^b\Omega_2{}^2) - (I + {}^b\Omega^T\Delta t)({}^b\dot{\Omega}_1 + {}^b\Omega_1{}^2))^{-1}({}^ba_2 - (I + {}^b\Omega^T\Delta t){}^ba_1)$, where:

$^b\Omega^2$ is an angular acceleration matrix of a first sample associated with the device in a body frame of reference, $^b\Omega^2$ is an angular acceleration matrix of a second sample associated with the device in a body frame of reference, $^b\Omega_1{}^2$ is the square of the angular velocity matrix of the first sample associated with the device in the body frame of reference, $^b\Omega_2{}^2$ is the square of the angular velocity matrix of the second sample associated with the device in the body frame of reference, $^ba_1$ is a linear acceleration of the first sample associated with the device in the body frame of reference, $^ba_2$ is a linear acceleration of the second sample associated with the device in the body frame of reference, $^b\Omega^T \Delta t$ is the average angular velocity between the first sample and the second sample and I is an identity matrix.

20. The method of claim 12 further comprising:

adjusting a position of an object on a user interface of the device based on said calculation.

* * * * *

UNITED STATES PATENT AND TRADEMARK OFFICE
CERTIFICATE OF CORRECTION

PATENT NO. : 10,120,463 B2
APPLICATION NO. : 15/796058
DATED : November 6, 2018
INVENTOR(S) : Matthew G. Liberty and Bryan A. Cook It is certified that error appears in the above-identified patent and that said Letters Patent is hereby corrected as shown below:

In the Claims

- In Claim 3, Column 18, Line 59, "device" should read --apparatus--.

- In Claim 14, Column 19, Line 52, "$^b\Omega^2$" should read -- $^b\dot{\Omega}$ --.

- In Claim 15, Column 20, Line 5, "$^b\Omega^2$" should read -- $^b\dot{\Omega}$ --.

- In Claim 15, Column 20, Line 14, "$^b\omega_x$" should read -- $^b\dot{\omega}_x$ --.

- In Claim 15, Column 20, Line 15, "$^b\omega_x$" should read -- $^b\dot{\omega}_y$ --.

- In Claim 15, Column 20, Line 17, "$^b\omega x$" should read -- $^b\dot{\omega}_z$ --.

- In Claim 16, Column 20, Line 31, "$^b\omega_x$" should read --$^b\omega_z$--.

- In Claim 19, Column 20, Line 45, "$^b\Omega^2$" should read -- $^b\dot{\Omega}_1$ --.

- In Claim 19, Column 20, Line 47, "$^b\Omega^2$" should read -- $^b\dot{\Omega}_2$ --.

Signed and Sealed this
Seventh Day of May, 2019

Andrei Iancu
*Director of the United States Patent and Trademark Office*